US006989425B2

(12) United States Patent
Dikland et al.

(10) Patent No.: US 6,989,425 B2
(45) Date of Patent: Jan. 24, 2006

(54) PROCESS FOR CROSS-LINKING A POLYMER

(75) Inventors: Herman Gerard Dikland, Sittard (NL); Davy Jacobus Margareth Hofkens, Roermond (NL)

(73) Assignee: DSM IP Assets B.V., Heerlen (NL)

( * ) Notice: Subject to any disclaimer, the term of this patent is extended or adjusted under 35 U.S.C. 154(b) by 1 day.

(21) Appl. No.: 10/476,665

(22) PCT Filed: Apr. 24, 2002

(86) PCT No.: PCT/NL02/00264

§ 371 (c)(1), (2), (4) Date: Mar. 19, 2004

(87) PCT Pub. No.: WO02/090408

PCT Pub. Date: Nov. 14, 2002

(65) Prior Publication Data

US 2004/0147685 A1 Jul. 29, 2004

(30) Foreign Application Priority Data

May 4, 2001 (NL) .................................... 1017996

(51) Int. Cl.
*C08C 19/04* (2006.01)
*C08F 8/06* (2006.01)

(52) U.S. Cl. ...................... 525/387; 525/383; 525/374; 525/192; 525/293; 525/296; 525/301; 525/313

(58) Field of Classification Search ................ 525/192, 525/293, 296, 301, 313, 374, 383, 387
See application file for complete search history.

(56) References Cited

U.S. PATENT DOCUMENTS

| | | | |
|---|---|---|---|
| 3,502,542 | A | 3/1970 | Wenisch et al. |
| 4,278,586 | A | 7/1981 | Marzola et al. |
| 4,385,136 | A | 5/1983 | Ancker et al. |
| 4,548,993 | A | 10/1985 | Garagnani et al. |

FOREIGN PATENT DOCUMENTS

| | | |
|---|---|---|
| GB | 880 596 | * 10/1961 |
| WO | 619 343 | 10/1994 |

OTHER PUBLICATIONS

Derwent Publications, Ltd., AN 1997-128706, English abstract of JP 09 12542 filed Jan. 14, 1997.

* cited by examiner

*Primary Examiner*—Ling-Sui Choi
(74) *Attorney, Agent, or Firm*—Mayer Brown Rowe & Maw LLP

(57) ABSTRACT

Process for cross-linking a polymer or a resin with the help of a peroxide, in the presence of a co-agent, the co-agent used being a compound according to formula 1, in which n is higher than or equal to 2, $R^1$ is an aliphatic or aromatic group and the $R^2$ and $R^3$ groups, independently of each other, can be a hydrogen atom, an aliphatic or an aromatic group. The polymer used preferably is EPDM or CSM.

14 Claims, No Drawings

PROCESS FOR CROSS-LINKING A POLYMER

CROSS REFERENCE TO RELATED APPLICATION

This application is the National Phase of International Application PCT/NL02/00264 filed Apr. 24, 2002 which designated the U.S., and that International Application was published under PCT Article 21(2) in English.

The invention relates to a process for cross-linking a polymer or a resin with the help of a peroxide, in the presence of a co-agent.

Polymers and resins that are crosslinked are for instance elastomers and thermosetting resins. Before the cross-linking, these polymers and resins are liquid at room temperature or at an elevated temperature, so that they can be processed into moulded parts, for instance by casting, compression moulding, injection moulding, extrusion, etc. When moulded, the polymer or the resin is cross-linked, whereby the polymer or the resin obtains its final properties as desired in view of the application, Thus, many cross-linked thermosetting resins exhibit a high stiffness, also at very high temperatures. Cross-linked elastomers behave rubber-like, as manifested for instance in a relatively low stiffness and a high, reversible elongation.

Depending on the type of polymer or resin it is possible to effect the cross-linking by means of a free-radical reaction, mostly with the help of peroxide. In order to enhance the efficiency of such a reaction it is often carried out in the presence of a co-agent. Due to the presence of a co-agent a network having a higher cross-link density is obtained, with the same amount of peroxide supplied. It is also possible to use a smaller amount of peroxide and yet obtain a comparable cross-link density. A co-agent is a compound which in the cross-linking process is integrated into the polymer network. A co-agent mostly has two or more carbon—carbon double bonds. Examples of the most commonly applied co-agents are triallyl cyanurate (TAC), polybutadiene, trimethylolpropane-tris-methacrylate (TRIM) and metaphenylene bis(maleimide) (BMI). Drawbacks of the known co-agents are for instance that they still lack efficiency or that, while being efficient, they already react at a too low temperature. An example of a co-agent which often exhibits a less than efficient cross-linking reaction is TAC. The use of BMI as a co-agent is known from W. Hofman's 'Rubber Technology Handbook', (Hanser, 1996), page 107, lines 8–9. When bismaleimides are used as co-agent, the cross-linking reaction is mostly efficient, but the cross-linking reaction rate is too high at low temperatures. As a result, premature cross-linking will occur during the processing into the moulded part, and because of the accompanying polymer viscosity increase, processing of the polymer into the moulded part is not possible or is detective.

The aim of the invention is to provide a process for cross-linking a polymer or a resin with the help of a peroxide, in the presence of a co-agent, whereby a highly efficient cross-linking reaction is obtained while nevertheless no or hardly any premature cross-linking occurs during the processing of the polymer or the resin into a moulded part.

Surprisingly, such a process is obtained due to a compound according to formula 1:

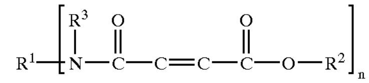

(1)

being used as co-agent, where n is higher than or equal to 2, $R^1$ is an aliphatic or aromatic group and the $R^2$ and $R^3$ groups, independently of each other, are a hydrogen atom, an aliphatic or an aromatic group.

With the process according to the invention a highly efficient cross-linking reaction is obtained, while nevertheless no or hardly any premature cross-linking occurs during the processing of the polymer into a moulded part.

A further advantage is the good miscibility of the compounds according to formula 1 with many polymers.

Another further advantage is that the compounds according to formula 1 can be prepared in a simple manner.

Yet another further advantage is that the polarity of the polymer obtained after cross-linking can be increased with compounds according to formula 1. This enables for instance the oil resistance of non-polar elastomers to be improved.

From U.S. Pat. No. 3,502,542 a process is known for bonding metal to a rubbery elastomer, comprising the steps of preparing a mixture comprising an elastomer and an acidic compound and curing said elastomer by introducing free radicals while contacting said metal and said elastomer. As acidic compounds in a long list for example Carboxyl; ic acids comprising more than one N-maleimido or N-maleamic acid radicals are mentioned. The group according to formula 1 is not disclosed. However N,N'-(1,3-phenylene)di-maleamic acid is mentioned. U.S. Pat. No. 3,502,542 is silent about efficiency of the cross-linking reaction. A method of binding an elastomer to a metal substrate by using N,N'-(1,3-phenylene)di-maleamic acid is therefore excluded from protection.

From JP-A-9012542 it is known to crosslink a mixture comprising a bismaleiimide and a bismaleiimide acid ester. However nothing is said about the crosslink efficiency. A process for cross-linking a mixture comprising a bismaleiimide and a bismaleiimide acid ester are therefore excluded from protection.

From U.S. Pat. No. 4,278,586 a method of Improving the adhesion between a polymer composition and a fiber is disclosed, by incorporating a bismaleiimide acid in the polymer composition. No peroxide cross-linking however is applied.

From EP-A-619343 a method is known for coating metal pipes with a polymer composition. To prepare the composition a modified polypropylene is added to a crosslinked polyolefin. The polypropylene is modified by for example an isopherone bismaleamic acid. However the bismaleamic acid is grafted onto the polypropylene and no cross-linking reaction takes place in the presence of the bismaleamic acid.

If $R^1$ of the compound according to formula 1 is an aromatic group, then $R^1$ is preferably a phenyl group. If $R^1$ is an aliphatic group, then $R^1$ preferably contains 1–12 C atoms. Still more preferably, $R^1$ is an aliphatic group with two or six carbon atoms. Most preferably, $R^1$ is an aliphatic group with six carbon atoms. The value of n preferably is 2–4. More preferably, the value of n is 2. $R^2$ and $R^3$ are preferably each a hydrogen atom.

The double carbon-carbon bond shown in formula 1 can be either in the cis or in the trans configuration. Preferably, the double carbon—carbon bond is in the cis configuration. Examples of suitable compounds according to formula 1 are phenylene bis(maleamide acid) (FBMA) and hexamethylene bis(maleamide acid) (HMBMA). Preferably, hexamethylene bis(maleamide add) is used.

The compounds according to formula 1 can be prepared for instance by reacting a compound having at least 2 amine groups with an equimolar amount of α-β unsaturated dicarboxylic acid, anhydride, ester or semi-ester.

The reaction can be carried out for instance by dissolving the compound with the amine groups and combining the carboxylic acid, the anhydride, the ester or the semi-ester with stirring, keeping the temperature between 0 and 30° C. Suitable solvents are for instance tetrahydrofuran and methyl-tert-butyl ether (MTBE).

In principle all polymers and resins that can be cross-linked with the help of a peroxide can be used in the process according to the invention, These are often polymers or resins without double bonds in the main chain. However, it is also possible to use polymers or resins with double bonds in the main chain.

By cross-linking the polymer or resin is understood that at least part of the polymer or resin forms a three-dimensional polymer network. This means that the part of the polymer or resin forming the three-dimensional network, also mentioned gel fraction, cannot any more be dissolved in a suitable solvent for the polymer or resin. The sol fraction is the part of the polymer or resin still being dissolved in the solvent Together the gel fraction and the sol fraction form 100% of the polymer or resin.

Preferably the gel fraction is at least 50%, more preferably 75%, still more preferably at least 95%, most preferably at least 99%.

Examples of thermosetting resins which are suitable for use in the process according to the invention are unsaturated polyester resins, alkyd resins, acrylate resins.

The process according to the invention gives good results when applied for the cross-linking of elastomers. Examples of elastomers which are very suitable to be used in the process according to the invention are chlorosulphonated polyethene (CSM), acrylate rubbers (ACM), chlorinated polyethene (CM), hydrogenated nitrilbutadiene rubber (H-NBR), silicone rubber (QM), fluororubber (FKM), polyethene vinylacetate (EVA), elastomers obtained by the polymerization of ethene and an alpha olefin (for instance EPM) and elastomers obtained by the polymerisation of ethers, an alpha olefin and a non-conjugated polyene (for instance EPDM).

The process according to the invention gives very good results when using elastomers obtained by the polymerization of ethene and an α-olefin (EPM). As α-olefin an α-olefin with 3–10 carbon atoms can for instance be used; examples are propane, butene, hexene, octene etc. Preferably, propene is used.

The process according to the invention also gives very good results when using elastomers obtained by polymerization of ethene, an α-olefin and a non-conjugated polyene (EPDM).

As α-olefin is used for instance an α-olefin with 3–10 carbon atoms; examples are propane, butane, hexene, octene etc. Preferably, propene is used.

The ethene to α-olefin weight ratio is preferably between 90/10 and 20/80. Preferably, the ethene to α-olefin weight ratio is between 70/30 and 40/60.

Examples of non-conjugated polyenes to be applied in the EPDM are 5-ethylidene-2-norbornene, 5-vinyl-2-norbornene, dicyclopentadiene or 1,4 hexadiene or mixtures thereof. The preparation of EPDM is known to the person skilled in the art. EPDM can for instance be prepared by polymerization with the help of a Ziegler-Natta catalyst or a metallocene catalyst.

The process according to the invention also gives very good results when chlorosulphonated polyethene (CSM) is used. CSM can for instance be prepared by means of UV irradiation of polyethene in an inert chlorinated solvent at 70–75° C. in the presence of gaseous chlorine and sulphur dioxide. The preparation of CSM is known to the person skilled in the art.

A yet further improved process according to the invention is obtained if the cross-linking of the CSM is carded out in the presence of a peroxide, a co-agent and an amine accelerator.

The polymer composition contains for instance $7*10^{-4}$–$2.2*10^{-1}$ mol of the amine accelerator per kilogram of CSM. Preferably, the polymer composition contains $3.5*10^{-2}$–$1.5*10^{-1}$ mol of the amine accelerator per kilogram of CSM.

Preferably, tertiary amines are used as amine accelerator. More preferably, use is made of hexamethylene tetramine (HMTA).

Prior to carrying out the process according to the invention, a composition is mostly prepared which contains the polymer or the resin, the peroxide and the co-agent, by mixing the polymer or the resin, the peroxide and the co-agent at a temperature below the temperature at which the polymer or the resin is crosslinked. The peroxide and the co-agent can be mixed simultaneously with the polymer or the resin, but it is also possible to mix the co-agent and the peroxide successively with the polymer or the resin. It may be of advantage for instance, to mix the peroxide with the polymer or the resin, which is previously mixed with the co-agent, shortly prior to the processing the composition into a moulded part. In this way the polymer or the resin is prevented from cross-linking already during storage subsequent to the mixing and prior to processing of the composition into the moulded part.

Examples of suitable peroxides are di-tert-butylperoxide, bis(tert-butylperoxyisopropyl)benzene (Perkadox™ 14/40 MB, Akzo Chemie), dicumylperoxide, butyl 4,4-bis(tert-butylperoxy)valerate, 2,5-bis(tert-butylperoxy)-2,5-methyl-hexane, 2,5-bis(tert-butylperoxy)-2,5-dimethyl-3-hexyn, tert-butyl 3-isopropenylcumylperoxide.

The composition containing the polymer or the resin contains for instance $2.9*10^{-3}$–$3*10^{-1}$ mol peroxide per kilogram of polymer or resin. Preferably, the composition contains $1.1*10^{-2}$–$1.5*10^{-1}$ mol peroxide per kilogram of polymer or resin. More preferably, the composition contains $1.4*10^{-2}$–$8.9*10^{-2}$ mol peroxide per kilogram of polymer or resin. At this relatively low peroxide concentration the invention is highly effective.

The composition contains for instance $3.1*10^{-2}$–$4.8*10^{-1}$ mol co-agent per kilogram of polymer or resin. Preferably, the composition contains $6.2*10^{-2}$–$3.2*10^{-1}$ mol co-agent per kilogram of polymer or resin. More preferably, the polymer composition contains $6.2*10^{-2}$–$1.6*10^{-1}$ mol co-agent per kilogram of polymer or resin.

The processing of the composition containing the polymer or the resin, the peroxide and the cogent into a moulded part usually takes place at a temperature higher than room temperature. Raising the temperature causes the viscosity of the composition to decline and as a result the moulding is made easier. That is why it is Important to carry out the moulding at a relatively high temperature. At the same time, however, it is also important that the cross linking reaction does not take place, or only to a minor extent, prior to the moulding. After the moulding the temperature of the composition is usually increased further, so that the peroxide decomposes and the cross-linking reaction takes place. In this relation it is important that the cross-linking reaction takes place efficiently. So during the moulding the reaction should not occur or only to a minor extent, while after the moulding the reaction should take place efficiently. It has been found that due to the use of the co-agent according to formula 1 in the process according to the invention an efficient cross-linking reaction is obtained while nevertheless no or hardly any premature cross-linking occurs during the processing of the polymer or resin into a moulded part.

The process according to the invention will now be illustrated by means of the following non-limiting examples.

A maleic anhydride solution was prepared by dissolving 15.0 grams (0.153 mol) of maleic anhydride in 250 ml of tetrahydrofuran with stirring at room temperature. In 5 minutes a solution of 8.27 grams (0.076 mol) of metaphenylene diamine in 250 ml of tetrahydrofuran was added dropwise to the maleic anhydride solution. A yellow suspension was obtained. Next the whole was stirred for 10 minutes, after which the yellow suspension was filtered and washed with 50 ml of tetrahydrofuran. The residue was a yellow solid substance in powder form, 23.1 grams (0.076 mol). Part of this yellow solid substance was dissolved in dimethyl sulphoxide (DMSO) and it was then identified as FBMA by means of 1 H-NMR measurements.

The preparation of the test material took place in an internal mixer (Brabender Plasticorder, 50 cc). The composition data of the test material are presented in Tables 1 and 4. Keltan™ 720 (EPDM, DSM) was first introduced into the kneader, at a temperature of 75° C., followed by the other ingredients, except for the peroxide and the co-agent. The whole was kneaded for 1 minute at 40 rpm and 75° C. Then the peroxide and the co-agent were added to the composition, which subsequently was kneaded for 4 minutes under the same circumstances Then the test material was pressed in 2 minutes at 60° C. to 2 mm thick sheets in a Fonteijne press, after which the measurements were effected.

The test material obtained was tested according to ISO6502 and ISO667. The ISO6502 test method was used to determine the cross-linking efficiency under the curing conditions for the material. The measurements were performed with a Monsanto™ rheometer MDR $200^{E}$. The measurement took place at 180° C. in 1200 seconds (20 minutes). A maximum and a minimum torque (N.m) were determined, as well the time at which 90% of the maximum torque had been reached (t90). The maximum torque is a measure of the degree of cross-linking of the material. The higher the maximum torque, the higher the degree of cross-linking. The t90 value is a measure of the rate of cross-linking. The lower t90, the higher the rate at which the cross-linking takes place.

The test method according to ISO667 was used as a method of measurement to determine the degree of cross-linking of the material under moulding conditions.

The measurements were carried out with the Monsanto™ Mooney MV 2000E. The measurements took place at 125° C. in 3600 seconds (60 minutes). The development of the viscosity shows whether premature cross-linking of the material occurs. The viscosity is expressed in Mooney units (MU), An increase in viscosity indicates the occurrence of cross-linking. The initial viscosity and the minimum viscosity were measured.

In addition, the points in time were determined at which the viscosity had increased by 2, 5 and 35 Mooney units, respectively, relative to the minimum viscosity (t2, t5 and t35, respectively). The measured t2, t5 and t35 provide an indication of the cross-linking reaction rate. The faster these points in time follow each other, the faster the cross-linking takes place.

EXAMPLE I AND COMPARATIVE EXPERIMENTS A AND B

Comparison of hexamethylene bis(maleamide acid) (HMBMA) and triallyl cyanurate (TAC)

TABLE 1

| Composition of test material | | | | |
|---|---|---|---|---|
| Ingredient | From | I | A | B |
| Keltan ™ 720 (EPDM) | DSM | 100 | 100 | 100 |
| ZnO active | Bayer AG | 5 | 5 | 5 |
| Stearic acid | HCHM SA/18, Simel S. p. A | 0.5 | 0.5 | 0.5 |
| N-550 carbon black | Sterling SO, Cabot B.V. | 70 | 70 | 70 |
| Mikrosohl ™-M40 whiting | Ver. Kreidewerke Dammann | 40 | 40 | 40 |
| Tudalen ™ B 8014, paraffinic oil | Klaus Dahleke KG | 70 | 70 | 70 |
| Perkadox ™ 14/40 MB | Akzo Chemie B. V. | 2 | 2 | 2 |
| HMBMA | | 5 | | |
| TAC-70 | Degussa AG | | | 5 |
| Total phr | | 292.5 | 287.5 | 292.5 |

The composition of the test materials used in example I and in comparative experiments A and B is shown in table 1. The test material of example I was prepared according to the process of the invention and contains HMBMA as co-agent. Comparative experiment A relates to a test material prepared without a co-agent, while for experiment B TAC was used as co-agent.

TABLE 2

| Results of measurements under curing conditions | | | | |
|---|---|---|---|---|
| ISO 6502 | | I | A | B |
| Minimum torque | N.m | 0.07 | 0.07 | 0.07 |
| Maximum torque | N.m | 0.52 | 0.29 | 0.35 |
| t90 | s | 352 | 280 | 400 |

Comparing in table 2 the results of example I with comparative experiments A (no co-agent) and B (TAC as co-agent) it is seen that the maximum torque of example I is higher than in comparative experiments A and B. A higher maximum torque is indicative of a higher degree of cross-linking of the test material. In addition, the time at which 90% of the maximum torque has been reached is shorter in example I than in comparative experiment B, which indicates that the cross-linking reaction rate in example I is higher. So it can be concluded that the use of HMBMA as co-agent results in a higher efficiency of the cross-linking reaction than TAC.

TABLE 3

| Results of measurements under moulding conditions | | | | |
|---|---|---|---|---|
| ISO 667 | | I | A | B |
| Initial Mooney | MU | 32.7 | 32.7 | 32.0 |
| Minimum Mooney | MU | 21.3 | 20.0 | 19.8 |
| t2 | s | — | — | — |
| t5 | s | — | — | — |
| t35 | s | — | — | — |

From the measurement results in table 3 it appears that in none of the examples cross-linking occurs in the test period. This indicates that there is no premature cross-linking under moulding conditions, i.e. when the material is moulded.

EXAMPLE II AND COMPARATIVE EXPERIMENTS A AND C

Comparison of hexamethylene bis(maleamide acid) (HMBMA) and trimethylolpropane-tris-acrylate (TRIM)

TABLE 4

| Composition of test material | | | | |
|---|---|---|---|---|
| Ingredient | From | II | A | C |
| Keltan ™ 720 (EPDM) | DSM | 100 | 100 | 100 |
| ZnO active | Bayer AG | 5 | 5 | 5 |
| Steario acid | HCHM SA/18, Simel S. p. A | 0.5 | 0.5 | 0.5 |
| N-550 carbon black | Sterling SO, Cabot B.V. | 70 | 70 | 70 |
| Mikrosohl ™-M40 whiting | Ver. Kreidewerke Dammann | 40 | 40 | 40 |
| Tudalen ™ B 8014, paraffinic oil | Klaus Dahleke KG | 70 | 70 | 70 |
| Perkadox ™ 14/40 MB | Akzo Chemie B. V. | 2 | 2 | 2 |
| HMBMA | | 10 | | |
| Sartomer ™ 350 (TRIM) | Cray Valley | | | 10 |
| Totaal phr | | 297.5 | 287.5 | 297.5 |

The composition of the test materials used in example II and in comparative experiments A and C is shown in table 4. The teat material of example I was prepared according to the process of the invention and contains HMBMA as co-agent. Comparative experiment A relates to a test material prepared without a co-agent, while for experiment C TRIM was used as co-agent.

TABLE 5

| Results under curing conditions | | | | |
|---|---|---|---|---|
| ISO 6502 | | II | A | C |
| Minimum torque | N.m | 0.08 | 0.07 | 0.06 |
| Maximum torque | N.m | 0.58 | 0.29 | 0.58 |
| t90 | s | 448 | 280 | 368 |

From table 5 it appears that in example II (HMBMA as co-agent) and comparative experiment C (TRIM as co-agent) the same maximum torque is reached. This indicates that the two co-agents give a comparable cross-linking efficiency under curing conditions.

TABLE 6

| Results under moulding conditions | | | | |
|---|---|---|---|---|
| ISO 667 | | II | A | C |
| Initial Mooney | MU | 33.8 | 32.7 | 26.9 |
| Minimum Mooney | MU | 22.0 | 20.0 | 16.6 |
| t2 | s | — | — | 1292 |
| t5 | s | — | — | 1340 |
| t35 | s | — | — | 1548 |

From table 6, however, it appears that the test material of comparative experiment C (TRIM as co-agent) begins to cross-link under the moulding conditions, while in example II (HMBMA as co-agent), as in comparative experiment A (no co-agent), there is no cross-linking yet.

Further, in experiment C the relatively small difference in time between the moment at which the viscosity has increased by 2 units relative to the minimum viscosity under the moulding conditions and the moment at which the viscosity has increased by 35 units relative to the minimum viscosity under the moulding conditions indicates that, once the cross-linking reaction has started, cross-linking takes place rapidly under the moulding conditions. This indicates that when HMBMA is used as co-agent in the moulding of the material, there is hardly any cross-linking, in contrast to the effect of TRIM being used as co-agent. A low degree of cross-linking under the moulding conditions is desirable.

Formula 1

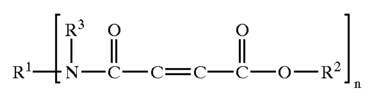

What is claimed is:

1. Process for cross-linking a polymer or a resin with the help of a peroxide, in the presence of a co-agent according to formula 1

(1)

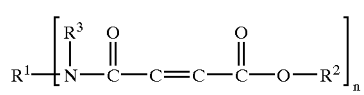

in which n is higher than or equal to 2, $R^1$ is an aliphatic or aromatic group and the $R^2$ and $R^3$ groups, independently of each other, can be a hydrogen atom, an aliphatic or an aromatic group, excluding a process for cross-linking a composition comprising a bismaleiimide resin and a bismaleiimide acid ester and excluding a process for binding an elastomer to a metal substrate by using N,N'-(1,3-phenylene)di-maleamic acid, wherein the polymer or resin is a polymer of ethylene, α-olefin and, optionally, non-conjugated polyene.

2. Process according to claim 1, wherein $R^1$ is a phenyl group or a C1–C12 alkyl group.

3. Process according to claim 1, wherein $R^1$ is an aliphatic group with two or six carbon atoms.

4. Process according to claim 1, wherein n=2.

5. Process according to claim 1, wherein $R^2$ is a hydrogen atom.

6. Process according to claim 1, wherein $R^3$ is a hydrogen atom.

7. Process according to claim 1, wherein $1.4\times10^{-2}$ to $8.9\times10^{-2}$ mol peroxide per kilogram of polymer or resin is used.

8. Process for cross-linking a polymer or a resin with the help of a peroxide, in the presence of a co-agent according to formula 1

(1)

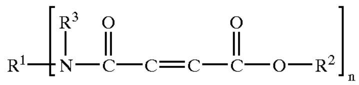

in which n is higher than or equal to 2, $R^1$ is an aliphatic or aromatic group and the $R^2$ and $R^3$ groups, independently of each other, can be a hydrogen atom, an aliphatic or an aromatic group, wherein the polymer or resin is a chloro-sulphonated polyethene.

9. Process according to claim 1, wherein the compound of formula 1 is phenylene bis(maleamide acid).

10. Process according to claim 1, wherein the compound of formula 1 is hexamethylene bis(maleamide acid).

11. Process according to claim 1, wherein the polymer or resin is a polymer of ethylene and an α-olefin.

12. Process according to claim 11, wherein the weight ratio of ethylene to α-olefin is from 70:30 to 40:60.

13. Process according to claim 1, wherein the polymer or resin is a polymer of ethylene, α-olefin and a non-conjugated polyene.

14. Process according to claim 13, wherein the non-conjugated polyene is 5-ethylidene-2-norbornene, 5-vinyl-2-norbornene, dicyclopentadiene or 1,4-hexadiene, or mixture thereof.

* * * * *